No. 626,054. Patented May 30, 1899.
G. W. CLARK.
MOLD FOR WATER TANKS.
(Application filed Jan. 3, 1898.)
(No Model.)
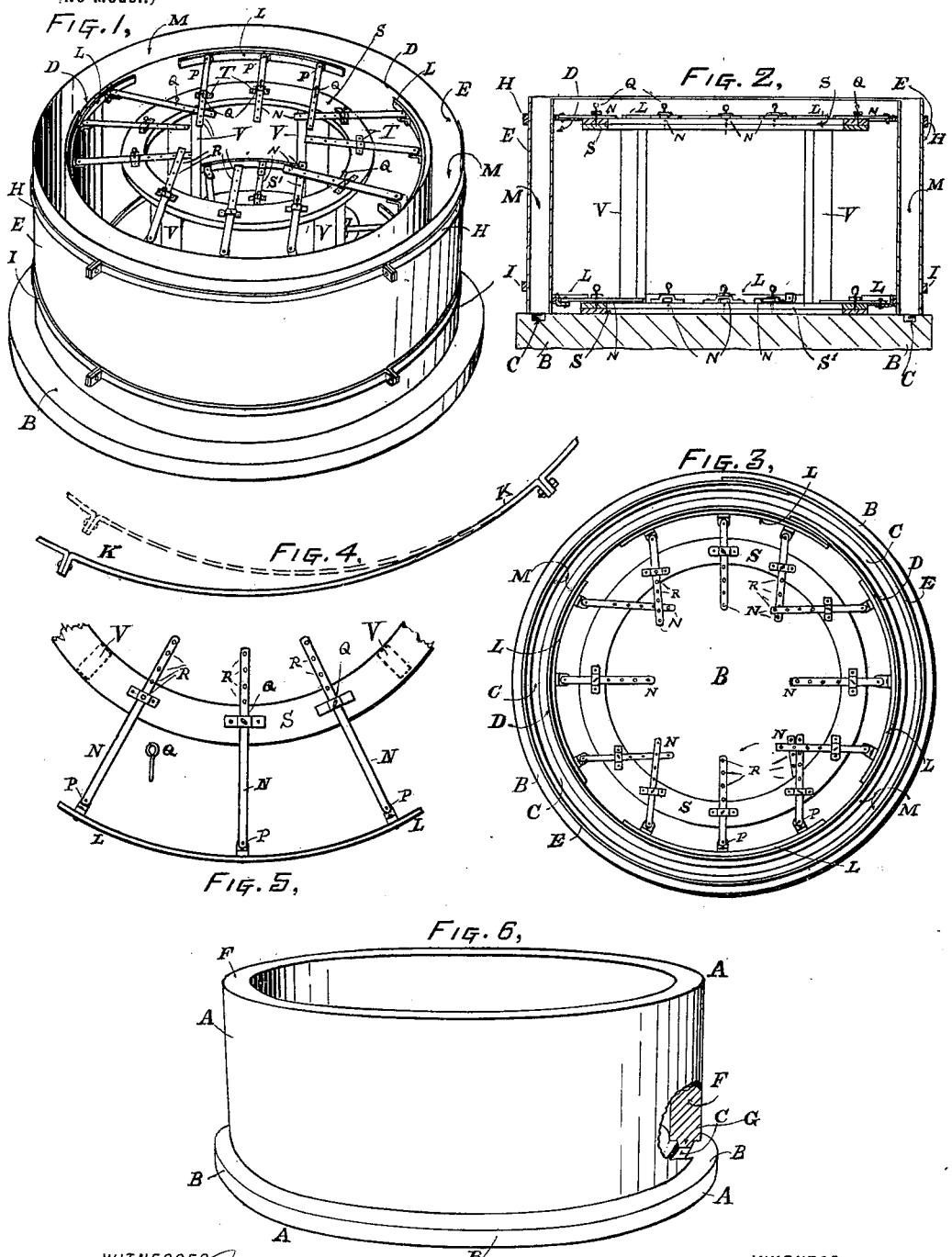
WITNESSES:
Geo Schneider
E. Taylor
INVENTOR:
George W. Clark,
BY
Josiah B. Frost,
ATTORNEY.

UNITED STATES PATENT OFFICE.

GEORGE W. CLARK, OF JEFFERSON, MICHIGAN.

MOLD FOR WATER-TANKS.

SPECIFICATION forming part of Letters Patent No. 626,054, dated May 30, 1899.

Application filed January 3, 1898. Serial No. 665,479. (No model.)

*To all whom it may concern:*

Be it known that I, GEORGE W. CLARK, a citizen of the United States, residing in the village of Jefferson, (Johnson post-office,) in the township of Columbia, in the county of Jackson and State of Michigan, have invented a new and useful Improvement in Molds for Water-Tanks, of which the following is a specification.

My invention relates to improvements in the construction of water-tanks which are made of cement and those of which cement is a constituent part.

The objects of my invention are, first, a uniformity and smoothness of the surfaces of cement tanks for convenience in cleaning, utility, and appearance; second, convenience and facility of construction; third, ease of transporting the necessary framework and walls used for construction, and, fourth, to unify and render the substance of the bottom and sides of the tank to be molded homogeneous at their joint and impervious by constructing the bottom of the tank first and using it in connection with and as part of the mold, then molding the cement (grout) for the sides in plastic state onto the bottom and into its groove or corrugation, thus combining cohesion and the mechanical resistance of a matching of the parts, the bottom to remain in each case of construction as the bottom of the tank. I attain these objects by the mechanism illustrated in the accompanying drawings, in which—

Figure 1 is a perspective view of the walls and framework used for constructing a water-tank according to my device; Fig. 2, a central vertical section of the same; Fig. 3, a plan view; Fig. 4, an enlarged plan view of a segment of one of the truss-hoops, the dotted lines showing a variation of curvature; Fig. 5, an enlarged plan view of a rib or core support with its attachments. Fig. 6 is a perspective view of a tank completed.

Similar letters refer to similar parts throughout the drawings.

A cement bottom B B for a tank is first made, of proper thickness and on proper footing, having a groove or channel C near, say, four inches from its periphery, which bottom B and its groove C may be circular or oval, according to the circular form or the variation from a circular form required for the tank to be constructed. On the bottom B each side of the groove C, near its outer and inner boundaries, sheet-iron walls D E are set, as shown in Figs. 1, 2, and 3, to form a mold M, into which cement or cement mortar is put to form the vertical wall F F of the tank A A, with its tongue G on the bottom of the cement wall F of the tank A A, as shown in the broken section of Fig. 6, molded and fitting into the groove C, securing the cement wall D and cement bottom B tightly together.

The sheet-iron walls D E of the mold M are made continuous around by lapping, and they are secured in position while the mold M is being filled and the mortar or cement is setting by steel truss-hoops H I, encircling the outer sheet-iron wall E near its top and bottom. The truss-hoops H I are formed of segments K K, joined together at their ends. (See Figs. 1, 3, and 4.) The size of the truss-hoops is regulated by the number of the segments in each—*e. g.*, a four-foot hoop formed of four segments is easily made into a five-foot hoop by opening one joint and inserting another segment of the same length and fastening its ends with the ends of the opened hoop, and so on for larger sizes, the flexibility of the segments allowing for change of curvature.

The inner sheet-iron wall D, which forms the core of the mold M M, is supported in place by ribs L L, having arms N N, jointed by their ends P P to said ribs at such points, say, one near each end and one at the middle of each rib, that the curvature of the ribs can be changed by regulating the relative radial distance of the joints P P from their common center, which is done by pins Q Q, inserted through holes R R along at intervals in the inner or free ends of the arms N N and into a frame S S S' S' above and below, which frame is situated concentric within the walls and is constructed of an upper circle or frame s s, supported upon legs v v v v, standing perpendicularly upon the circle or frame s' s', the legs being secured to both circles or frames. For substantialness iron straps T T with holes U U are secured to the frame S S S' S', the pins first passing down through them into those in the arms and then into the frame, all as shown.

Having thus fully described my invention, what I claim, and desire to secure by Letters Patent, is—

1. A mold for cement tanks, having inner and outer circular sheet-iron walls and a core, the outer wall being supported by truss-hoops, the inner wall by ribs which are provided with pivoted arms adapted to be adjustably secured to the core, substantially as shown and described.

2. In a mold for tanks, the combination of inner and outer sheet-iron walls and a core, the said walls adapted to be contracted or expanded, the outer wall being supported by truss-hoops, the inner wall supported by ribs, the said ribs having pivoted arms, the said arms adapted to be adjustably secured to the core, substantially as shown and for the purpose set forth.

GEORGE W. CLARK.

In presence of—
 JOSIAH B. FROST,
 DESDEMONA SNYDER.